(12) United States Patent
Tomiyama et al.

(10) Patent No.: US 7,539,121 B2
(45) Date of Patent: May 26, 2009

(54) OPTICAL RECORDING MEDIUM AND PROCESS FOR PRODUCING THE SAME

(75) Inventors: Morio Tomiyama, Nara (JP); Shinya Abe, Osaka (JP); Yuuko Kawaguchi, Osaka (JP); Eiji Ohno, Osaka (JP)

(73) Assignee: Panasonic Corporation, Osaka (JP)

( * ) Notice: Subject to any disclaimer, the term of this patent is extended or adjusted under 35 U.S.C. 154(b) by 571 days.

(21) Appl. No.: 10/550,069

(22) PCT Filed: Apr. 1, 2004

(86) PCT No.: PCT/JP2004/004778

§ 371 (c)(1),
(2), (4) Date: Sep. 21, 2005

(87) PCT Pub. No.: WO2004/090882

PCT Pub. Date: Oct. 21, 2004

(65) Prior Publication Data

US 2007/0117046 A1    May 24, 2007

(30) Foreign Application Priority Data

Apr. 4, 2003   (JP) ............................. 2003-101160

(51) Int. Cl.
*G11B 7/24* (2006.01)

(52) U.S. Cl. ................................................. 369/275.4
(58) Field of Classification Search ............... 369/13.54, 369/275.3, 275.4
See application file for complete search history.

(56) References Cited

U.S. PATENT DOCUMENTS 5,202,875 A    4/1993   Rosen et al.
(Continued)

FOREIGN PATENT DOCUMENTS

EP    0 725 396    8/1996
(Continued)

OTHER PUBLICATIONS

Supplementary European Search Report (in English language) issued Mar. 5, 2008.

*Primary Examiner*—Hoa T Nguyen
*Assistant Examiner*—Andrew J Sasinowski
(74) *Attorney, Agent, or Firm*—Wenderoth, Lind & Ponack, L.L.P.

(57) ABSTRACT

An optical recording medium is provided with: a first substrate having first pits on one face thereof; a first reflective layer that is formed on the face bearing the first pits of the first substrate in a manner so as to reflect lands and recesses of the first pits; a second substrate that is formed on the first reflective layer, with second pits being formed on a face on the side opposite to the first reflective layer; a second reflective layer that is formed on the face bearing the second pits of the second substrate in a manner so as to reflect lands and recesses of the second pits; and a cover layer formed on the second reflective layer. In this structure, the first pit depth $d_1$ that is a difference between lands and recesses of the first reflective layer, the wavelength $\lambda$ of signal-reproducing laser light and the refractive index $n_1$ of the second substrate satisfy the following relational expressions: $\lambda/(5n_1) \leq d_1 \leq \lambda/(3n_1)$ and $d_1 \neq \lambda/(4n_1)$. Moreover, the second pit depth $d_2$, which is a difference between lands and recesses of the second reflective layer, the wavelength $\lambda$ of signal-reproducing laser light and the refractive index $n_2$ of the cover layer satisfy the following relational expressions: $\lambda/(5n_2) \leq d_2 \leq \lambda/(3n_2)$ and $d_2 \neq \lambda/(4n_2)$.

20 Claims, 9 Drawing Sheets

U.S. PATENT DOCUMENTS

| | | | |
|---|---|---|---|
| 5,255,262 A | | 10/1993 | Best et al. |
| 5,459,712 A | * | 10/1995 | Sugaya et al. ............ 369/275.4 |
| 5,822,294 A | | 10/1998 | Ohtomo et al. |
| 5,848,050 A | * | 12/1998 | Nagasawa et al. ........ 369/275.4 |
| 5,940,364 A | * | 8/1999 | Ogata et al. ............. 369/275.4 |
| 6,058,100 A | | 5/2000 | Mieda et al. |
| 6,063,468 A | | 5/2000 | Aratani et al. |
| 6,117,284 A | * | 9/2000 | Mueller ................. 204/192.27 |
| 6,175,548 B1 | | 1/2001 | Kashiwagi |
| 2004/0095876 A1 | | 5/2004 | Abe |

FOREIGN PATENT DOCUMENTS

| | | |
|---|---|---|
| EP | 1 067 523 | 1/2001 |
| JP | 5-151591 | 6/1993 |
| JP | 5-151644 | 6/1993 |
| JP | 9-251668 | 9/1997 |
| JP | 10-302309 | 11/1998 |
| JP | 2000-011453 | 1/2000 |
| JP | 2000-231722 | 8/2000 |
| JP | 2001-076383 | 3/2001 |
| JP | 2002-92969 | 3/2002 |
| JP | 2002-109784 | 4/2002 |
| JP | 2002-279707 | 9/2002 |
| WO | 00/79525 | 12/2000 |
| WO | 01/16950 | 3/2001 |
| WO | 02/29789 | 4/2002 |

* cited by examiner

OPTICAL RECORDING MEDIUM AND PROCESS FOR PRODUCING THE SAME

FIELD OF THE INVENTION

This invention relates to an optical recording medium of a high-density laminated-layer type for use in a reproducing and manufacturing method in which such an optical recording medium is manufactured by using a stacking method or a laminating method.

BACKGROUND ART

In recent years, along with an expanded amount of information required by an information apparatus, an image audio apparatus and the like, public attention has been focused on an optical disk as a recording medium, because of its ease in data access, capability of storing a large amount of data, and compactness, wherein an attempt has been made to achieve high-density recorded information on such a recording medium. For example, with respect to a method for achieving a high-density optical disk, an optical recording medium has been proposed in which: by using a reproducing head with a numeric aperture (NA) of 0.85 as a condensing lens for converging laser light, with a laser-beam wavelength being set to about 400 nm, a capacity of about 25 GB in the case of a single layer has been achieved, and a capacity of about 50 GB in the case of two layers has been achieved. For example, such an optical disk allows a recording or reproducing operation on or from two signal recording layers from one surface side, and is capable of recording or reproducing information of BS digital broadcasting for about 4 hours.

Referring to FIG. 2, the following description will discuss the structure and a manufacturing method of a two-layer optical disk, which is a conventional optical disk (Japanese Patent Laid-Open Publication No. 2002-092969). FIG. 2 is a cross-sectional view that shows a two-layer optical disk, which is conventional optical disk. The conventional optical disk is constituted by a first substrate 201, a first reflective layer 202, a second substrate 203, a second reflective layer 204 and a cover layer 205 that are successively laminated. On one surface of the first substrate 201, first pits are formed, which have a continuous spiral form as a plane shape, each of which having a concave shape in cross section. The first substrate 201 is designed to have a thickness of about 1.1 mm. This thickness is prepared so as to set the total thickness of the disk to about 1.2 mm. Thus, the disk rigidity is intensified and thickness compatibility with other disks such as CDs and DVDs is achieved. The first reflective layer 202, which reflects lands and recesses of the first pits, is formed on the first pits of the first substrate 201. On the first reflective layer 202, a first signal face 206 is formed, made of pits each having a concave shape, when viewed from the laser light, with a track pitch 207 of about 0.32 μm and a depth of about 70 nm. Here, the first reflective layer 202 reflects laser light that is made incident thereon from the cover layer 205 side. The first reflective layer 202 has a thickness of 50 nm, and is designed to have a reflectance of about 70% with respect to laser light having a wavelength of 400 nm.

With respect to the second substrate 203, second pits having a convex shape are formed on a face on the cover layer 205 side that is the side opposite to the first substrate 201. Moreover, the second reflective layer 204, which reflects lands and recesses of the second pits, is formed on the second pits of the second substrate 203. In the same manner as the first signal face 206 of the first reflective layer 202, on the second reflective layer 204, a second signal face 208 is formed, made of pits each having a convex shape, when viewed from the laser light irradiation side, with a track pitch of about 0.32 μm and a depth of about 70 nm. The lands and recesses of the pits of the second signal face 208 are directed in a direction opposite to the pits of the first signal face 206, and a signal is recorded by these pits. The second substrate 203 is made from a material that virtually transmits laser light. The second reflective layer 204, which is made from the same material as the first reflective layer 202, is formed with a thickness of about 20 nm through a sputtering method. By making the second reflective layer 204 thinner, laser light is partially transmitted, while being partially reflected. The laser light that has been transmitted through the second reflective layer 204 is reflected by the first signal face 206 on the first reflective layer 202, and after having been again transmitted through the second reflective layer 204, is returned to the reproducing head. Here, by setting the thickness of the second reflective layer 204 to 20 nm, the intensity of laser light that has been reflected by the first signal face 206 formed on the first reflective layer 202 and returned to the reproducing head is made equal to the intensity of laser light that has been reflected by the second signal face 208 formed on the second reflective layer 204 and returned to the reproducing head. The cover layer 205, which has a thickness of about 0.1 mm, is made from a material that virtually transmits laser light.

In an attempt to achieve 50 GB by using the above-mentioned structure, supposing that a reproducing head having, for example, a semiconductor laser wavelength of 400 nm with an NA of 0.85 is used, the track pitch TP of signals formed on the first substrate 201 and the second substrate 203 is set to 0.32 μm and the pit length of 2T signals, which forms the shortest pit when 1-7 modulation system is adopted as the signal modulation system, is set to 0.149 μm.

Further, the following description will discuss a manufacturing method for a conventional optical disk.

(a) An injection compression molding process is carried out by using a metal mold stamper on which signals made of pits, each having a concave shape in cross section, and that have a continuous spiral shape on the plane, are formed on one surface. Thus, a first substrate 201 is formed made of resin having first pits that have been formed by transferring the pits of the stamper.

(b) A first reflective layer 202, for example, made of Ag, is formed on the first pits of the first substrate 201 so as to have an even thickness by using a method such as a sputtering method and a vapor deposition method. Thus, a first signal face 206, which reflects the lands and recesses of the first pits, is formed on the first reflective layer 202.

(c) A material such as photo-curing resin is applied to the first reflective layer 202, and a transfer substrate having a transfer signal face of concave-shaped pits is superposed thereon so that second pits, each having a convex-shape, formed by transferring concave-convex shapes of the transfer signal face, are formed on the surface of the photo-curing resin.

(d) The photo-curing resin is photo-cured so that a second substrate 203 having the second pits is formed.

(e) In the same manner as the first reflective layer 202, a second reflective layer 204 is formed on the second pits so as to have an even thickness by using a method such as a sputtering method and a vapor deposition method. Thus, a second signal face 208, which reflects the lands and recesses of the second pits, is formed on the second reflective layer 204. The thickness of the second reflective layer 204 is determined in such a manner that, when reading laser light is made incident on the cover layer side, the quantities of light rays returned to the reproducing head from the respective reflective layers are made equal with one another.

(f) After a sheet made from a material that is virtually transparent to laser light has been formed on the second reflective layer 204 by using photo-curing resin or pressure-sensitive bonding agent, or photo-curing resin has been applied thereon through spin-coating method, this is photo-cured to form a cover layer 205.

An optical disk is manufactured through the above-mentioned respective processes.

Moreover, the following description will discuss a method for reproducing information recorded on the respective signal faces of a conventional two-layer optical disk having the above-mentioned structure.

(a) In the case when the first signal face 206 formed on the first reflective layer 202 is reproduced, for example, the disk is rotated with a desired number of revolutions, and reading laser light is converged by a condensing lens of a reproducing head so that the laser light is focus-controlled as a spot on the first signal face of the optical disk that is rotating at the desired number of revolutions.

(b) Successively, the signal rows are traced by carrying out a known tracking controlling operation so that reflected light is detected from the signal face by a light-receiving element, and read as an analog signal representing a voltage change.

(c) Moreover, in the case when the second signal face 208, formed on the second reflective layer 204 that is the other signal face, is reproduced, in the same manner as the reproducing process from the first signal face 206, reading laser light is converged by a condensing lens of a reproducing head so that the laser light is focus-controlled as a spot on the second signal face of the optical disk that is rotating at the desired number of revolutions.

(d) Successively, the signal rows are traced by carrying out a known tracking controlling operation so that reflected light is detected from the signal face by a light-receiving element, and read as an analog signal representing a voltage change.

In the above-mentioned reproducing process, with respect to the depth of signal pits constituted by lands and recesses formed on the signal face, its optical depth d is virtually made coincident with $\lambda/(4n)$ (n: the refractive index of a material formed on the signal face) so that the amplitude of the playback signal becomes the greatest. For this reason, with respect to the optical disk reproduction for a read-only memory (ROM), a phase-difference tracking system, which makes the tracking error signal greatest when the playback signal amplitude is the greatest, is adopted in most cases, as a tracking error detection method used for tracking control.

The following description will discuss playback signal characteristics obtained when each of the signal faces of the optical disk is reproduced. In the above-mentioned signal reproduction, the known push-pull tracking error signal TEpp was 0.02. The push-pull tracking error signal TEpp is preliminarily standardized by dividing a push-pull tracking error signal TEpp-org by a sum signal TEsum obtained by voltage-converting the sum of light quantities of light-receiving elements that form the push-pull tracking error signal TEpp-org, so that the reflectance of the disk does not give adverse effects to the signal amplitude. However, the size of this TEpp signal amplitude fails to provide sufficient gain used for tracking control, with the result being that the tracking control is not carried out by receiving adverse effects due to influences of shape changes caused by vibration and deviations in disk manufacturing processes.

Moreover, in the case when the tracking control was carried out by altering the tracking system to the phase-difference tracking system to reproduce signal pits on the first signal face 206, the degree of modulation ((playback signal amplitude of longest pit)/(amount of DC of greatest reflectance of longest pit)) that represents the size of amplitude of the playback signal was 0.45 and the playback signal jitter that represents signal quality was 5.3%. In this case, a known limit equalizer was used for measuring playback signal jitters. Furthermore, in the case when known focusing control was carried out so as to form a spot focused by the reproducing lens of the reproducing head on the second signal face 208 made of signal pits, each having a convex shape when viewed from the laser light irradiation side, formed on the second reflective layer 202, the push-pull tracking error signal TEpp was 0.03. Furthermore, the degree of modulation that represents the size of amplitude of the playback signal RF was 0.40 and the playback signal jitter that represents signal quality was 6.7%, thus, in comparison with the reproducing operation of the first signal face 206, although the push-pull tracking error signal TEpp is prepared as virtually the same signal, the degree of modulation that represents the size of amplitude of the playback signal RF and the playback signal jitter that represents signal quality show that it is not possible to obtain good signal quality due to influences from insufficient transferring of the signal face.

Based upon these facts, it is not possible to carry out tracking control and it is also not possible to obtain a sufficient jitter value that represents playback signal quality, unless a phase-difference tracking system having large power consumption is adopted.

In the conventional optical disk, in most cases, the optical depth d of a signal is set to about $\lambda/(4n)$, and a phase difference tracking system is adopted as its tracking control system. However, the problem with this phase difference tracking system is that high power consumption is required. In contrast, a push-pull tracking control system, which is another tracking control system, requires lower power consumption in comparison with the phase difference tracking system. However, in the case of the push-pull tracking control system being adopted, due to the fact that the optical depth of pits on the signal face is set to just $\lambda/(4n)$, it is not possible to obtain a sufficient amplitude in the tracking error signal. Moreover, upon transferring and forming signal pits having the optical depth of $\lambda/(4n)$ by using photo-curing resin, due to miniaturized pits used for preparing high-density signals, it is not possible to carry out an even transferring process over the entire signal face, resulting in a failure in providing sufficient playback signal quality for reproduction.

The present invention is directed to an optical recording medium that is capable of signal-reproducing in both of the phase difference tracking control system and the push-pull tracking control system as the tracking control system, which has superior reproducing characteristics of recording signals, and to manufacturing method for such an optical recording medium.

SUMMARY OF THE INVENTION

The above-mentioned problems can be solved by the optical recording medium of present invention, the optical recording medium being provided with: a substrate having pits on one face thereof;

a reflective layer that is formed on the face bearing the pits of the substrate in a manner so as to reflect lands and recesses of the pits; and a cover layer that is formed on the reflective layer. This structure is characterized in that the pit depth d, which is a difference between lands and recesses of the reflective layer, the wavelength λ of signal-reproducing laser light and the refractive index n of the cover layer satisfy the following relational expressions: $\lambda/(5n) \leq d \leq \lambda/(3n)$ and $d \neq \lambda/(4n)$.

In another aspect, the optical recording medium according to the present invention is provided with: a first substrate having first pits on one face thereof; and a first reflective layer that is formed on the face bearing the first pits of the first substrate in a manner so as to reflect lands and recesses of the first pits;

a second substrate that is formed on the first reflective layer, with second pits being formed on a face on the side opposite to the first reflective layer;

a second reflective layer that is formed on the face bearing the second pits of the second substrate in a manner so as to reflect lands and recesses of the second pits; and a cover layer formed on the second reflective layer. This structure is characterized in that the first pit depth $d_1$, which is a difference between lands and recesses of the first reflective layer, the wavelength λ of signal-reproducing laser light and the refractive index $n_1$ of the second substrate satisfy the following relational expressions:

$$\lambda/(5n_1) \leq d_1 \leq \lambda/(3n_1) \text{ and } d_1 \neq \lambda/(4n_1),$$

and in that the second pit depth $d_2$, which is a difference between lands and recesses of the second reflective layer, the wavelength λ of signal-reproducing laser light and the refractive index $n_2$ of the cover layer satisfy the following relational expressions:

$$\lambda/(5n_2) \leq d_2 \leq \lambda/(3n_2) \text{ and } d_2 \neq \lambda/(4n_2).$$

Here, the first pits of the first substrate and the second pits of the second substrate may be formed by a combination of concave-shaped pits and convex-shaped pits. Alternatively, the first pits of the first substrate and the second pits of the second substrate may be formed by a combination of convex-shaped pits and concave-shaped pits.

Moreover, the first pit depth $d_1$, which is a difference between recesses and lands of the first reflective layer, and the second pit depth $d_2$, which is a difference between lands and recesses of the second reflective layer, may satisfy the following relational expressions, with respect to the refractive index $n_1$ of the second substrate, the refractive index $n_2$ of the cover layer and the wavelength λ of signal-reproducing laser light:

$$4n_1d_1 < \lambda < 4n_2d_2.$$

Furthermore, the first pit depth $d_1$, which is a difference between recesses and lands of the first reflective layer, and the second pit depth $d_2$, which is a difference between lands and recesses of the second reflective layer, may satisfy the following relational expressions, with respect to the refractive index $n_1$ of the second substrate, the refractive index $n_2$ of the cover layer and the wavelength λ of signal-reproducing laser light:

$$4n_2d_2 < \lambda < 4n_1d_1.$$

Here, the first pit depth $d_1$ and the second pit depth $d_2$ may satisfy the following relational expression, $d_2 < d_1$ Moreover, both of the first pits of the first substrate and the second pits of the second substrate may be formed by a combination of concave-shaped pits or a combination of convex-shaped pits.

Furthermore, the first pit depth $d_1$, which is a difference between recesses and lands of the first reflective layer, and the second pit depth $d_2$, which is a difference between lands and recesses of the second reflective layer, may satisfy the following relational expressions, with respect to the refractive index $n_1$ of the second substrate, the refractive index $n_2$ of the cover layer and the wavelength λ of signal-reproducing laser light:

$$\lambda < 4n_1d_1 \text{ and } \lambda < 4n_2d_2.$$

Furthermore, the first pit depth $d_1$, which is a difference between recesses and lands of the first reflective layer, and the second pit depth $d_2$, which is a difference between lands and recesses of the second reflective layer, may satisfy the following relational expressions, with respect to the refractive index $n_1$ of the second substrate, the refractive index $n_2$ of the cover layer and the wavelength λ of signal-reproducing laser light:

$$4n_1d_1 < \lambda \text{ and } 4n_2d_2 < \lambda.$$

Here, the second substrate may be formed by using an ultraviolet-ray curable resin or photo-curing resin.

Moreover, at least either the first pits of the first reflective layer or the second pits of the second reflective layer may include information for tracking polarity.

Furthermore, the information for tracking polarity may be recorded as winding pit rows.

Here, the winding of the winding pit rows may be formed by frequency modulation.

Moreover, the optical recording medium of the present invention may be further provided with: a third substrate that is formed on the second reflective layer in place of the cover layer, the third substrate having third pits formed on a face on the side opposite to the second reflective layer, with reflective index of $n_2$;

a third reflective layer that is formed on the face bearing the third pits of the third substrate in a manner so as to reflect lands and recesses of the third pits; and a cover layer formed on the third reflective layer. This structure is characterized in that the third pit depth $d_3$ of the third reflective layer, which is a difference between lands and recesses of the third reflective layer, the wavelength λ of signal-reproducing laser light and the refractive index $n_3$ of the cover layer satisfy the following relational expressions:

$$\lambda/(5n_3) \leq d_3 \leq \lambda/(3n_3) \text{ and } d_3 \neq \lambda/(4n_3).$$

A manufacturing method for the optical recording medium in accordance with the present invention includes the steps of: forming a first substrate having first pits on one face;

forming a first reflective layer on the first pits of the first substrate in a manner so as to reflect recesses and lands of the first pits;

providing photo-curing resin on the first reflective layer;

superposing a transfer substrate having a transfer pit face as one face on the photo-curing resin;

applying light toward the photo-curing resin from the transfer substrate side to cure the photo-curing resin so that second pits, obtained by transferring the transfer pit face of the transfer substrate, are formed on the surface of the photo-curing resin;

forming a second reflective layer that reflects lands and recesses of the second pits; and forming a cover layer formed on the second reflective layer. This structure is characterized in that the first pit depth $d_1$, which is a difference between recesses and lands of the first reflective layer, the wavelength λ of signal-reproducing laser light and the refractive index $n_1$ of the second substrate satisfy the following relational expressions:

$$\lambda/(5n_1) \leq d_1 \leq \lambda/(3n_1) \text{ and } d_1 \neq \lambda/(4n_1),$$

and in that the second pit depth $d_2$, which is a difference between lands and recesses of the second reflective layer, the wavelength λ of signal-reproducing laser light and the refractive index $n_2$ of the cover layer satisfy the following relational expressions:

$$\lambda/(5n_2) \leq d_2 \leq \lambda/(3n_2) \text{ and } d_2 \neq \lambda/(4n_2).$$

In the optical recording medium of the present invention, the pit depth d is set in a range, ($\lambda/(5n) \leq d \leq \lambda/(3n)$), so as to obtain sufficient playback signal, with the depth $\lambda/(4n)$ that fails to provide a sufficient size of amplitude of a push-pull tracking error signal being excluded. With this arrangement, a sufficient playback signal can be obtained from a signal face made of pits on the reflective layer, thereby making it possible to provide tracking control by using a push-pull tracking control system.

BRIEF DESCRIPTION OF THE DRAWINGS

These and other objects, features and advantages of the present invention will become apparent upon consideration of the following detailed description of the invention when read in conjunction with the drawing figures in which.

DESCRIPTION OF THE PREFERRED EMBODIMENTS

Figure 1:
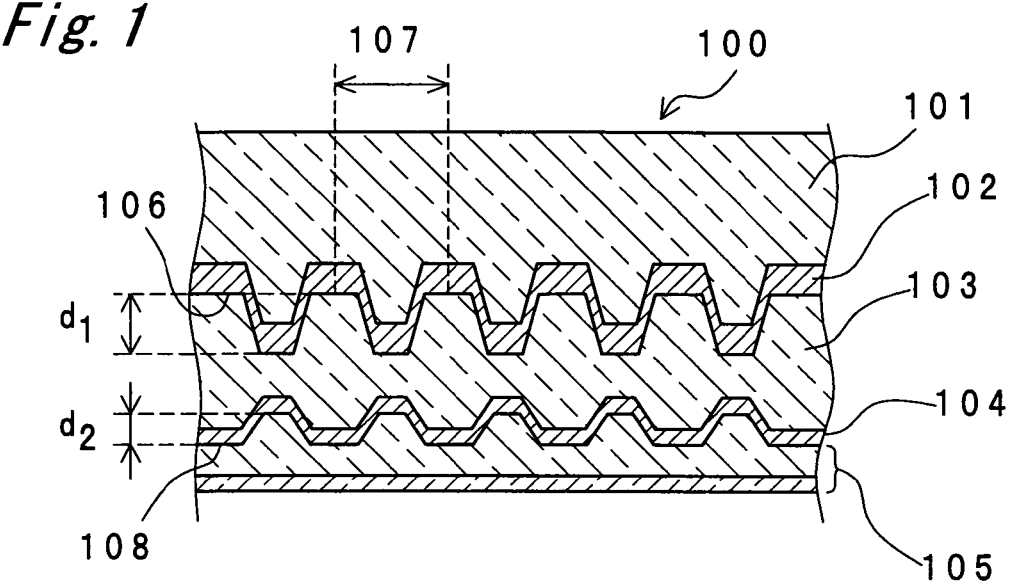
FIG. 1 is a cross-sectional view that shows an optical disk in accordance with the first embodiment of the present invention.
Figure 2:
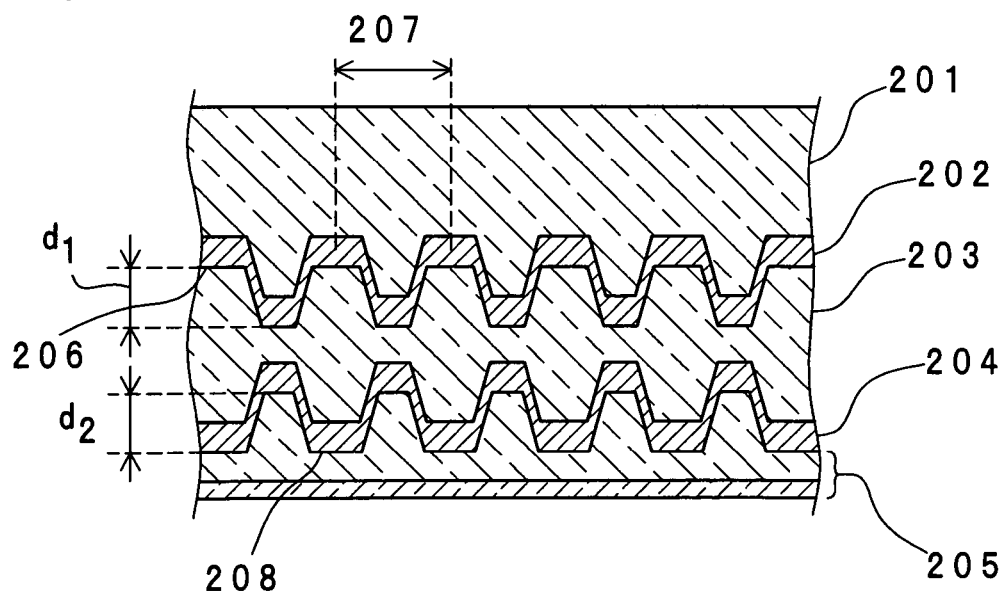
FIG. 2 is a cross-sectional view that shows an optical disk in accordance with a conventional technique.

Referring to attached drawings, the following description will discuss embodiments of the present invention. Here, in the respective drawings, the same reference numeral represents the same constituent element or those elements that have the same functions and operations.

Embodiment 1

The following description will discuss an optical recording medium and manufacturing method thereof in accordance with first embodiment of the present invention. With respect to the signal reproducing system of this optical recording medium 100, a reproducing head having a semiconductor laser wavelength of 400 nm with NA of 0.85 is used. Moreover, the following description discusses a case in which: the track pitch TP of signals formed on the first signal layer and the second signal layer of the optical recording medium is 0.32 μm and the pit length of a 2T signal that forms the shortest pit upon adopting a 1-7 modulation system as the signal modulation system is 0.149 μm.

FIG. 1 is a cross-sectional view that shows an optical disk in accordance with embodiment 1 of the present invention. This optical disk 100 has a structure in which a first substrate 101, a first reflective layer 102, a second substrate 103, a second reflective layer 104 and a cover layer 105 are successively stacked. On one face of the first substrate 101, pits are formed, which have a continuous spiral form as a plane shape and each of which has a concave shape in its cross section.

The thickness of the first substrate 101 is set to about 1.1 mm. This thickness is prepared so as to set the total thickness of the disk to about 1.2 mm. Thus, the disk rigidity is intensified and thickness compatibility with other disks such as CDs and DVDs is achieved. On one of the faces of the first substrate 101, pits are formed, each having a concave shape, when viewed from the laser light incident side, with a track pitch 107 of about 0.32 μm and a depth of about 70 nm. The first substrate 101 is made from polycarbonate resin having a good transferring property, which is placed by using an injection compression molding method. Here, the first reflective layer 102 has a structure in which on the concave-shaped pits of the first substrate 101, a first signal face 106 is formed, which is made of concave-shaped pits that are virtually the same as the concave-shaped pits with the corresponding recesses and lands thereof being reflected. Moreover, the first reflective layer 102, which is made from, for example, Ag, reflects laser light that is made incident thereon from the cover layer 105 side. The first reflective layer 102 is laminated so that the signal pattern of the first signal face 106 is prepared. The thickness of the first reflective layer 102 is set to 50 nm, which is a thickness that provides a virtually saturated reflectance of 70% with respect to laser light having a wavelength of 400 nm. Since the first reflective layer 102 is formed on the concave-shaped pits of the first substrate 101 as well as on the reproducing laser light incident side, the pit shape tends to vary depending on the thickness of the layer. Therefore, the thickness is set to about 50 nm so that it becomes possible to provide a good S/N ratio with saturated reflectance and also to prevent any change in the signal shape.

Supposing that the wavelength of signal-reproducing laser light is λ, and that the refractive index of the material of the second substrate 103 to be formed on the first reflective layer 102 is $n_1$, the depth $d_1$ of the first pits, which is a difference between recesses and lands on the first reflective layer 102, is designed to satisfy the following relational expression (1):

$$\lambda/(4n_1) \leq d_1 \leq \lambda/(3n_1) \tag{1}$$

As will be described later, the above-mentioned expression is given by taking into consideration the application of the injection compression molding method for providing polycarbonate resin with good transferring property as the manufacturing method of the first substrate 101, the signal characteristics upon reproducing and the use of a push-pull tracking error signal.

Here, since photo-curing resin having refractive index $n_1$ of about 1.5 is used as the second substrate 103 formed on the first reflective layer 102, the first pit depth $d_1$ is set in a range that satisfies the following relational expression (2):

$$67 \text{ nm} < d_1 \leq 89 \text{ nm} \tag{2}$$

With respect to the second substrate 103, pits having a convex shape are formed on a face on the cover layer 105 side that is the side opposite to the first substrate 101. In the same manner as the first substrate 101, on the second substrate 103, recording signals, made of pits each having a convex shape, when viewed from the laser light irradiation side, with a track pitch of about 0.32 μm and a depth of about 70 nm, are formed. The pits of the second substrate are directed in a direction opposite to the pits of the first substrate, and a signal is recorded by these pits. The second substrate 103 is made from a material that virtually transmits laser light. In the same manner as the first reflective layer 102, a second reflective layer 104, which is made from Ag, is formed on the second substrate 103 with a thickness of about 20 nm through a sputtering method so that the reflectance is set to about 20% with respect to laser light having a wavelength of 400 nm. Here, the second reflective layer 104 has a structure in which on the convex-shaped pits of the second substrate 103, a second signal face 108, which is made of convex-shaped pits that are virtually the same as the concave-shaped pits in a manner so as to reflect the corresponding lands and recesses, is formed. By making the second reflective layer 104 thinner, laser light is partially transmitted, while being partially reflected. The laser light that has been transmitted through the second reflective layer 104 is reflected by the first signal face 106 on the first reflective layer 102, and after having been again transmitted through the second reflective layer 104, is returned to the reproducing head. Here, by setting the thickness of the second reflective layer 104 to 20 nm, the intensity of laser light that has been reflected by the first signal face 106 formed on the first reflective layer 102 and returned to the reproducing head is made equal to the intensity of laser light that has been reflected by the second signal face 108 formed on the second reflective layer 104 and returned to the reproducing head. The cover layer 105, which has a thickness of about 0.1 mm, is made from a material that virtually transmits laser light.

By taking into consideration the fact that the transferring property of signal pits becomes poor when formed by a drawn photo-curing resin material in comparison with the transferring property of signal pits formed by injection compression molding process of polycarbonate, the signal properties upon reproducing and the push-pull tracking error signal, the second pit depth $d_2$ is set so that, supposing that the wavelength of signal-reproducing laser light is $\lambda$, and that the refractive index of the material of the cover layer 105 formed on the second reflective layer 104 is $n_2$, it satisfies the following relational expression (3):

$$\lambda/(5 \times n_2) \leq d_2 \leq \lambda/(4 \times n_2) \tag{3}$$

In the present embodiment, photo-curing resin or pressure-sensitive bonding agent having refractive index $n_2$ of about 1.5 is used as the material for the cover layer 105 formed on the second reflective layer 104. Therefore, the second pit depth $d_2$ is set in a range that satisfies the following relational expression (4):

$$53 \text{ nm} \leq d_2 < 67 \text{ nm} \tag{4}$$

The cover layer 105 having a thickness of about 0.08 mm is formed on the second reflective layer 104. The cover layer 105 is formed by laminating a sheet made from polycarbonate resin having a thickness of about 70 μm through photo-curing resin or pressure-sensitive bonding agent having a thickness of about 10 μm. The optical disk having the above-mentioned structure is subjected to a reproducing operation through the cover layer 105.

Here, the above-mentioned disk structure has been explained by exemplifying a case in which the reflective layer material made from Ag is used as the reflective layer. The present invention, however, is not limited to this structure, and another material, such as Al and Ag alloy, may be used. Moreover, the cover layer 105 has been explained by exemplifying a case in which a sheet made from polycarbonate resin is laminated through photo-curing resin or pressure-sensitive bonding agent. The present invention, however, is not limited to this structure, and the cover layer 105 may be formed by using only the photo-curing resin.

FIGS. 3 to 6 are cross-sectional views that show respective processes in a manufacturing method of an optical disk in accordance with embodiment 1 of the present invention. The following description will discuss the manufacturing method of this optical disk.

(a) First, a disc-shaped first substrate 301 having a thickness of approximately 1.1 mm, which has concave-shaped pits on its one face, is formed through an injection compression molding process by using a polycarbonate material.

(b) On the recesses and lands of the concave-shaped pits of the first substrate 301, a first reflective layer 102, which reflects the recesses and lands, is formed. Thus, a first signal face, made of concave-shaped pits having a first pit depth $d_1$ in a range from 67 nm to 89 nm that is a difference between the recesses and lands, is formed on the first reflective layer 102.

Figure 3A:
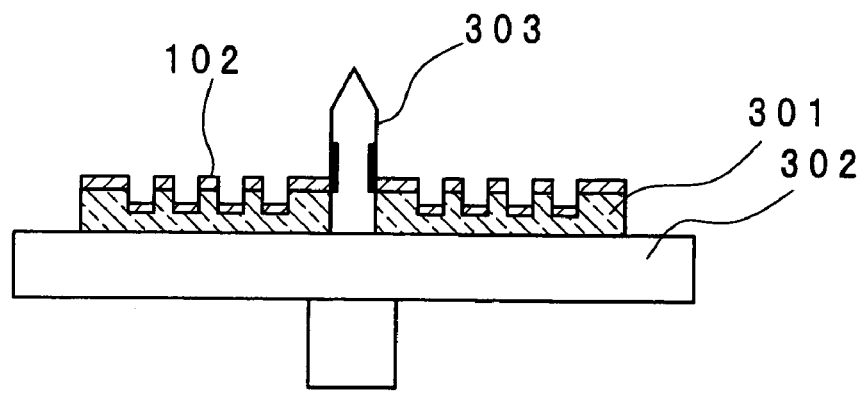
FIG. 3A is a drawing that shows a process in which a first substrate is suction-fixed onto a rotary table.

(c) The first substrate 301 is suction-fixed onto a rotary table 302. A centering jig 303 is placed approximately in the center of the rotary table 302 so as to make the amount of eccentricity smaller with respect to the rotary shaft of the rotary table 302. The first substrate 301 is centered by the centering jig 303, and suction-fixed by a plurality of small vacuum holes formed on the upper face of the rotary table 302 (FIG. 3A).

Figure 3B:
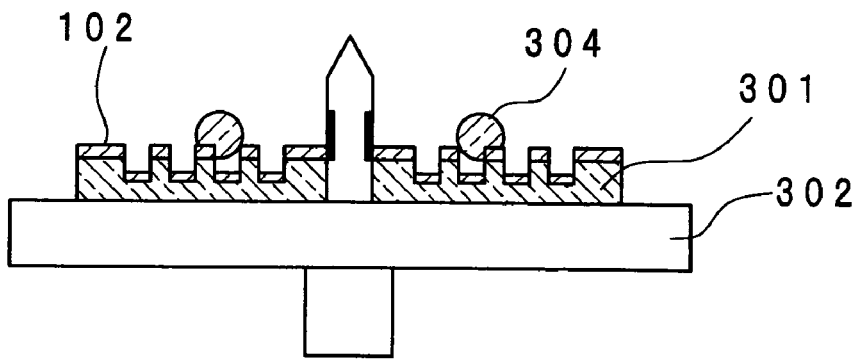
FIG. 3B is a drawing that shows a process in which ultraviolet-ray curable resin is applied.

(d) Onto the first substrate 301 thus suction-fixed, ultraviolet-ray curable resin 304 is applied at desired radii in a manner so as to form approximately concentric circles by using a dispenser (FIG. 3B). The recesses and lands of the first reflective layer 102 are buried by this ultraviolet-ray curable resin. Here, the present embodiment uses the ultraviolet-ray curable resin. The present invention, however, is not limited to this material, and another photo-curing resin, which is cured by light irradiation within a visible light range, may be used.

Figure 3C:
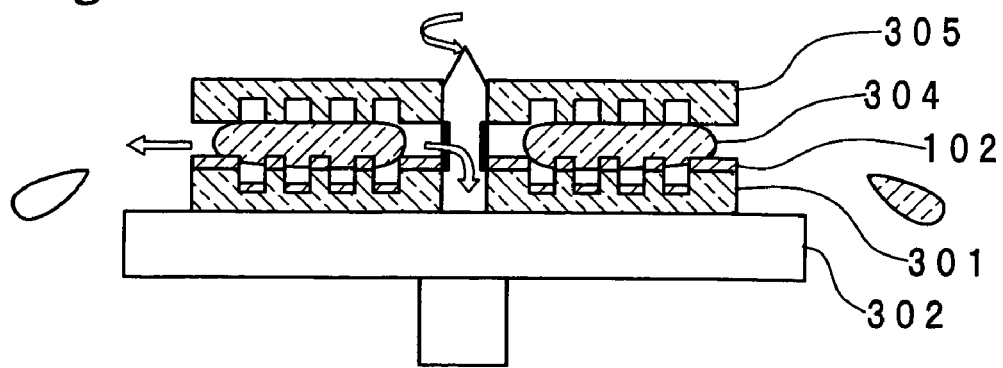
FIG. 3C is a drawing that shows a process in which a transfer substrate is superposed.

(e) Moreover, on the ultraviolet-ray curable resin 304 applied on the first substrate 301, a transfer stamper 305, which has a transfer information face of concave-shaped pits on its one face, is superposed so that the transfer information face is made face to face therewith (FIG. 3C).

(f) The rotary table 302 is spin-rotated with the first substrate 301 and the transfer stamper 305 being integrally held so that the ultraviolet-ray curable resin 304 is drawn. Simultaneously, the concave-convex shape of signal pits of the transfer information face of the transfer stamper 305 is copied onto the ultraviolet-ray curable resin 304 so that convex-shaped pits having an opposite shape to the concave-convex shape are formed. At this time, the depth of the concave-shaped pits, formed on the transfer information face of the transfer stamper 305, is set in a range from 53 nm to 67 nm. Here, the transfer stamper 305 is formed by injection-compression molding the same polycarbonate material as the first substrate 301 so as to provide good separating property from the ultraviolet-ray curable resin. The viscosity of the ultraviolet-ray curable resin 304 is set to about 150 Pa·s, and a disc, which is 120 mm in diameter and 0.6 mm in thickness with a center hole having a diameter of 30 mm being formed in the center, is used as the transfer stamper 305. In the present embodiment, an explanation has been given by exemplifying a case in which a polycarbonate material is used for the transfer stamper; however, another material, such as polyolefin-based resin and acrylic resin, that has good separating property from the ultraviolet-ray curable resin may be used. Moreover, with respect to the ultraviolet-ray curable resin 304, the present embodiment has exemplified a case in which one kind of resin is used; however, the present invention is not intended to be limited by this case. For example, by using resin A having good adhesion to the first reflective layer 102, resin B having a good separating property from the transfer stamper 305 and resin C having good adhesion to both of the resin A and the resin B in combination, it becomes possible to intensify the disk rigidity, and also to improve the productivity of the optical disk. Moreover, by drawing the ultraviolet-ray curable resin through spin-rotation, it becomes possible to provide even transferring property within the disk plane and an even thickness in the ultraviolet-ray curable resin.

Figure 4A:
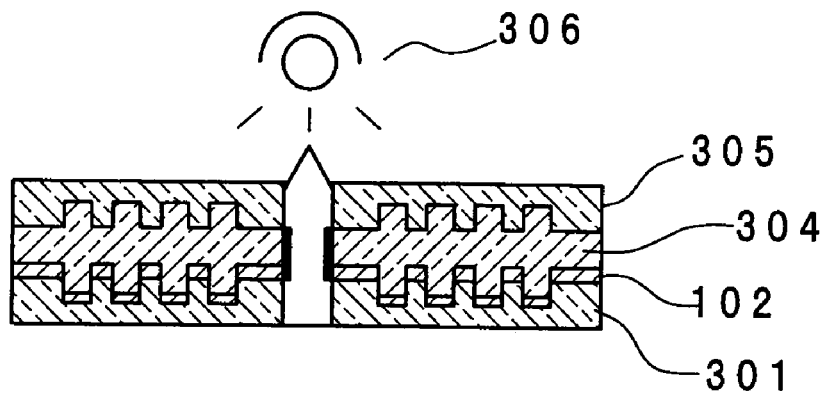
FIG. 4A is a drawing that shows a process in which the ultraviolet-ray curable resin is cured by irradiating ultraviolet rays thereto.
Figure 4B:
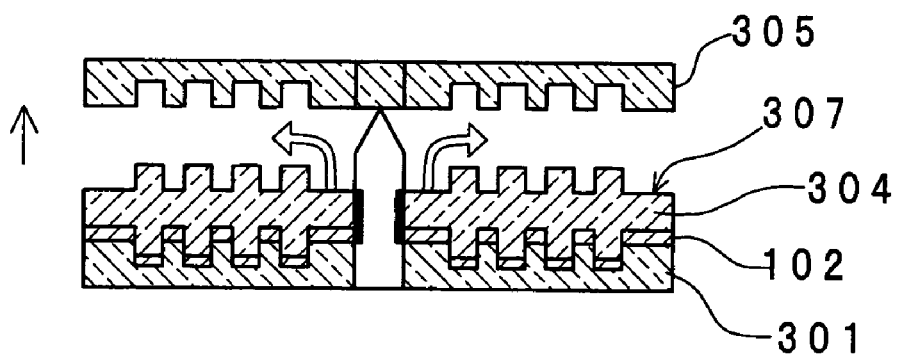
FIG. 4B is a drawing that shows a process in which the transfer substrate is separated.

(g) The ultraviolet-ray curable resin 304 between the first substrate 301 and the transfer stamper 305 is irradiated with ultraviolet rays through an ultraviolet-ray irradiation device 306 so that the ultraviolet-ray curable resin 304 is cured (FIG. 4A).

(h) By separating the transfer stamper 305 from the cured ultraviolet-ray curable resin 304 (FIG. 4B), convex-shaped pits 307, prepared by transferring depths of the recesses and lands of the transfer information face of the transfer stamper 305, are formed on the cured ultraviolet-ray curable resin 304.

Figure 4C:
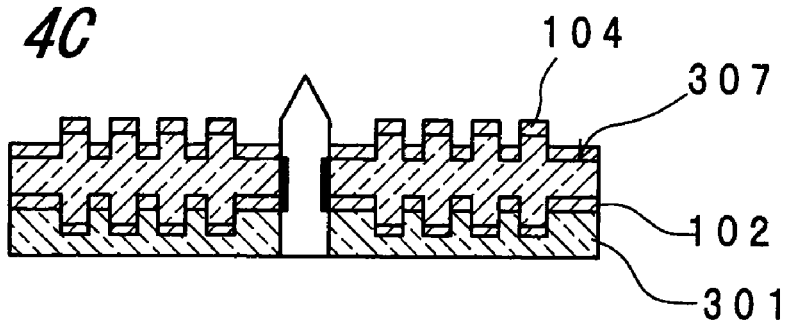
FIG. 4C is a drawing that shows a process in which a second reflective layer is formed.

(i) After convex-shaped pits 307 have been formed, a reflective layer, made from Ag or the like, is formed on the convex-shaped pits 307 as the second reflective layer 104 by using a method such as a sputtering method that is the same method as conventionally used (FIG. 4C). Thus, a second signal face, made of convex-shaped pits that reflect the recesses and lands of the convex-shaped pits 307, is formed on the second reflective layer 104.

Figure 5A:
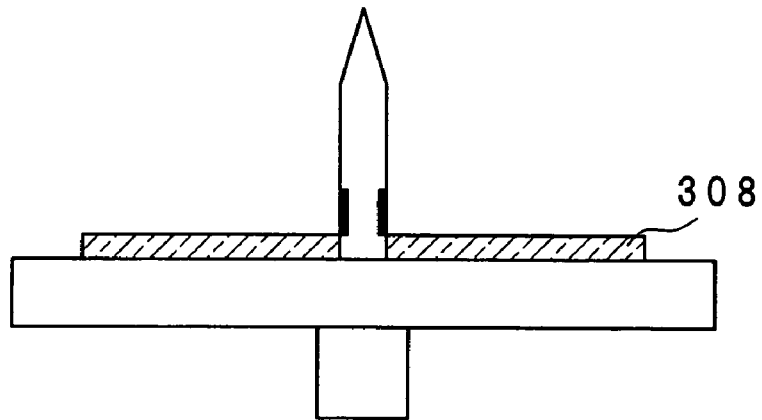
FIG. 5A is a drawing that shows a process in which a cover plate is suction-fixed onto a rotary table.
Figure 5B:
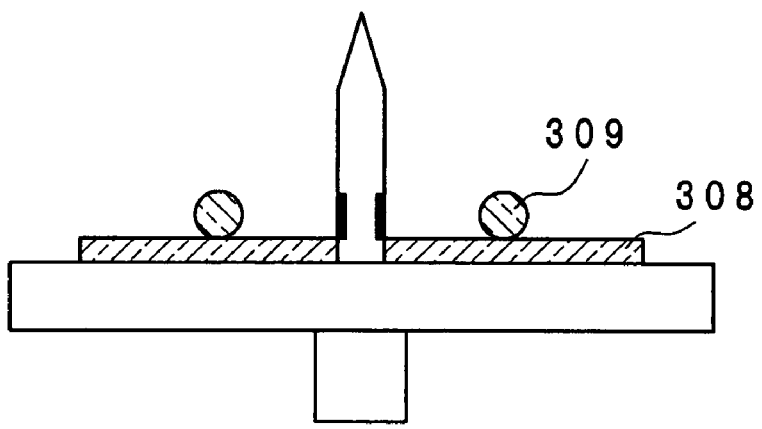
FIG. 5B is a drawing that shows a process in which an ultraviolet-ray curable resin is applied.

(j) A thin substrate 308, made of a disc having a thickness of about 70 μm, is suction-fixed onto a rotary table 302 (FIG. 5A). This thin substrate 308 is transparent to laser light used for recording and reproducing, that is, light is virtually allowed to transmit through this substrate.

(k) Onto the thin substrate 308, ultraviolet-ray curable resin 309 is applied (FIG. 5B), that is, the resin is applied at desired radii in a manner so as to form approximately concentric circles by using a dispenser.

Figure 5C:
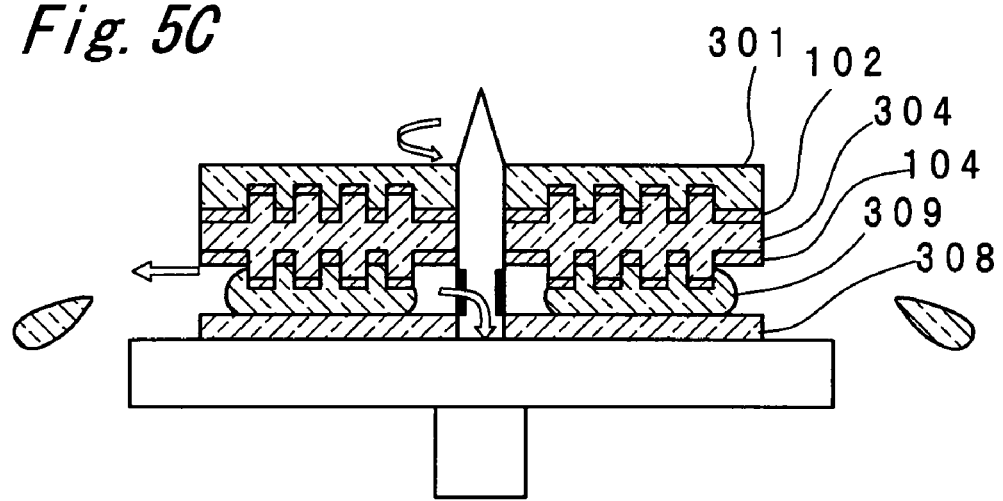
FIG. 5C is a drawing that shows a process in which a second reflective layer is placed face to face with a cover plate and superposed thereon.

(l) On the thin substrate 308 to which the ultraviolet-ray curable resin 309 has been applied, the second reflective layer 104 of the laminated member obtained as shown in FIG. 4C is superposed with the respective faces being made face to face with each other (FIG. 5C).

Figure 6A:
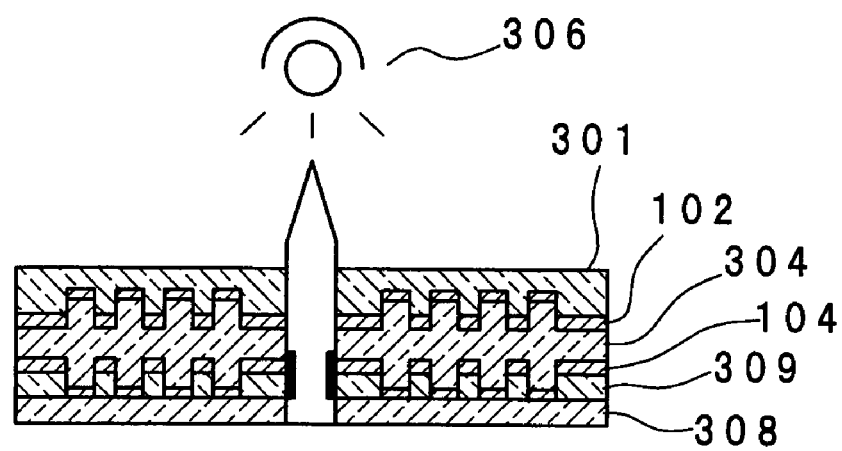
FIG. 6A is a drawing that shows a process in which the ultraviolet-ray curable resin is cured by irradiating ultraviolet rays thereto.
Figure 6B:
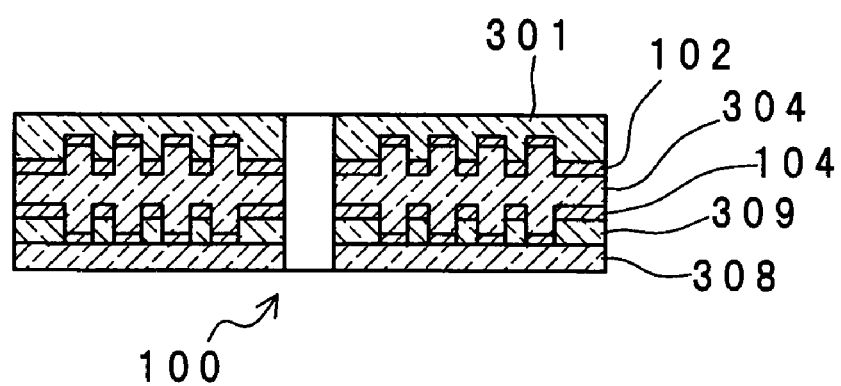
FIG. 6B is a cross-sectional view of an optical disk that has been manufactured.

(m) The ultraviolet-ray curable resin 309 between the second substrate 301 and the thin substrate 308 is irradiated with ultraviolet rays through the ultraviolet-ray irradiation device 306 so that the ultraviolet-ray curable resin 309 is cured (FIG. 6A). Thus, a laminated member entirely formed into an integral part, that is, a multi-layer optical disk 100 is manufactured. Here, the cured ultraviolet-ray curable resin (transparent layer) 309 is virtually transparent to reproducing and recording light. The thin substrate 308 and the cured ultraviolet-ray curable resin 309 form a cover layer of this optical disk 100.

In this embodiment, ultraviolet-ray curable resin is applied onto the thin substrate 308, and the second reflective layer is aligned face to face and superposed thereon; however, in a reversed manner, ultraviolet-ray curable resin 309 is applied onto the second reflective layer 104, and the thin substrate 308 may be superposed thereon. Moreover, it is preferable to spin-rotate the ultraviolet-ray curable resin 309 that has been applied, so as to remove bubbles mixed in the ultraviolet-ray curable resin 309 and control the thickness thereof.

With respect to the optical disk 100 manufactured by the above-mentioned manufacturing method, in the case when laser light from the reproducing head is made incident thereon from the cover layer 105 side, the first signal face of the first substrate 101 forms concave-shaped signal pits, while the second signal face of the second substrate 103 forms convex-shaped signal pits. Thus, upon carrying out a tracking control on the respective signal pits through a push-pull tracking system, when the signal pit depths of the first signal face and the second signal face are the same, it is necessary to provide respectively different polarities in the tracking polarity. In a player for reproducing the disk, however, it is necessary to avoid changing operation for tracking polarities in order to shorten disk-information seeking time and simplify the circuit structure. Therefore, in the present invention, the first pit depth $d_1$, which is a difference between the recesses and lands of the first reflective layer, is set so as to satisfy the following expression (5):

$$\lambda/(4n_1) < d_1 \leq \lambda/(3n_1) \tag{5}$$

Moreover, the second pit depth $d_2$ of the second substrate is set so as to satisfy the following expression (6):

$$\lambda/(5n_2) \leq d_2 < \lambda/(4n_2) \tag{6}$$

With respect to $2n_1 d_1$ and $2n_2 d_2$ that are obtained by respectively multiplying the first pit depth $d_1$ of the first reflective layer and the second pit depth $d_2$ of the second reflective layer by refractive indexes $n_1$ and $n_2$, a difference is prepared so as to form a relationship in sizes as shown in the following expression, with $\lambda/2$ interpolated in between.

$$2n_2 d_2 < \lambda/2 < 2n_1 d_1 \tag{7}$$

The above-mentioned relational expression is transformed to the following relational expression:

$$4n_2 d_2 < \lambda < 4n_1 d_1 \tag{8}$$

Here, each of the depths, $\lambda/(4n_1)$ and $\lambda/(4n_2)$, that form borders, corresponds to a depth at which the polarity of a push-pull tracking error signal is switched, that is, a depth at which the push-pull tracking error signal becomes virtually zero. For this reason, with respect to the pit depths $d_1$ and $d_2$, the depths $\lambda/(4n_1)$ and $\lambda/(4n_2)$ at which the push-pull tracking error signal fails to obtain an amplitude having a sufficient size are respectively excluded. Moreover, the polarity is switched at the above-mentioned depth ($\lambda/(4n_1)$, $\lambda/(4n_2)$) as a border; therefore, by providing a difference between the respective pit depths with each of the depths $\lambda/(4n_1)$ and $\lambda/(4n_2)$ interpolated in between, it becomes unnecessary to change tracking polarities in the reproducing system, even when the player carries out reproducing operation while mutually switching the first signal face and the second signal face. Here, within a range of the pit depth $d_1$ from $\lambda/(5n_1)$ to $\lambda/(3n_1)$ as well as within a range of the pit depth $d_2$ from $\lambda/(5n_2)$ to $\lambda/(3n_2)$, a phase-difference tracking operation is carried out sufficiently. Thus, this optical disk can be controlled by both of the tracking systems, that is, the push-pull tracking system and the phase-difference tracking system.

Here, the first substrate 101 is formed by an injection-compression molding process. In the injection-compression molding, it has been known that as the pit depth becomes shallower, the releasing property of the substrate from the stamper becomes better. Therefore, with respect to the upper limit of the range of the first pit depth $d_1$, the depth needs to be set to at least not more than a depth that allows stable signal transferring and mold releasing through the injection-compression molding process. Moreover, with respect to the lower limit, the depth needs to be set to at least not less than a depth that provides not more than 6.5% in the reproducing signal jitter that indicates playback signal quality, so as not to impair the S/N ratio of the playback signal. With respect to the first substrate 101, by making the pit depth shallower or deeper than the conventional pit depth ($\lambda/(4n)$), the amplitude of the push-pull tracking error signal is maintained at not less than 0.08. Thus, the tracking control can be carried out in the push-pull tracking system.

Here, the second substrate 103 is made from ultraviolet-ray curable resin or photo-curing resin; therefore, as the pit depth on the transfer stamper becomes deeper, it becomes more difficult to carry out a transferring operation onto the second substrate in association with viscosity of the ultraviolet-ray curable resin or the photo-curing resin. In particular, as the pit becomes smaller, the transferring property becomes poorer.

Figure 7:
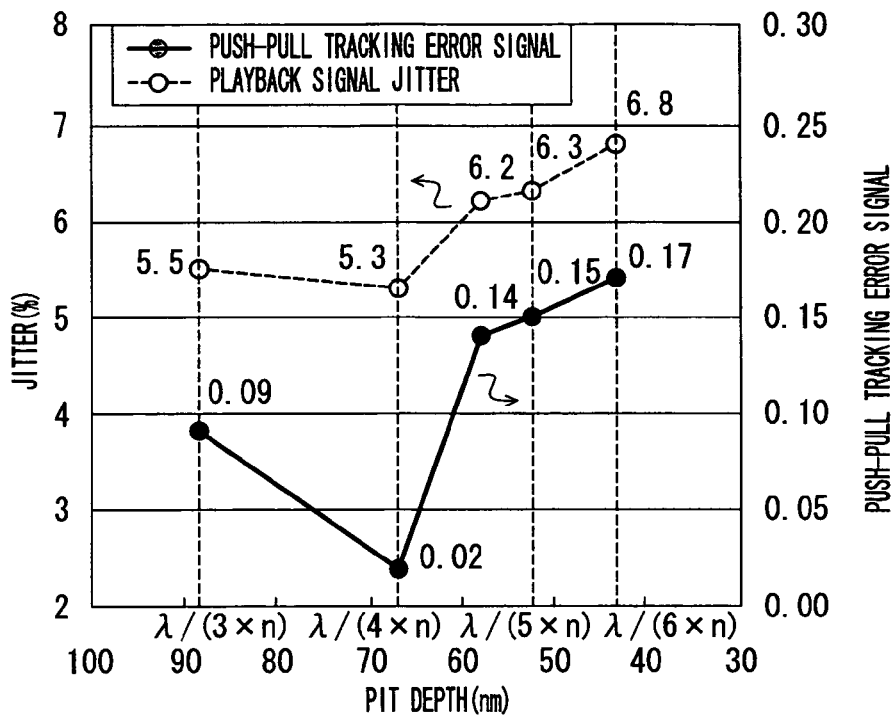
FIG. 7 is a drawing that shows a relationship between jitter of a playback signal in relation to a pit depth and amplitude of a push-pull tracking error signal.

FIG. 7 is a drawing that shows a relationship between the jitter of a playback signal and the push-pull tracking error signal in association with the pit depth. In the axis of abscissas in FIG. 7, the pit depth is indicated so as to become greater from right to left in an opposite manner to the normal graph. This graph is used in an attempt to indicate the relationship, $\lambda/(m \times n)$, in which the wavelength $\lambda$ and the refractive index n of signal reproducing laser light and integer number m are used.

Figure 8:
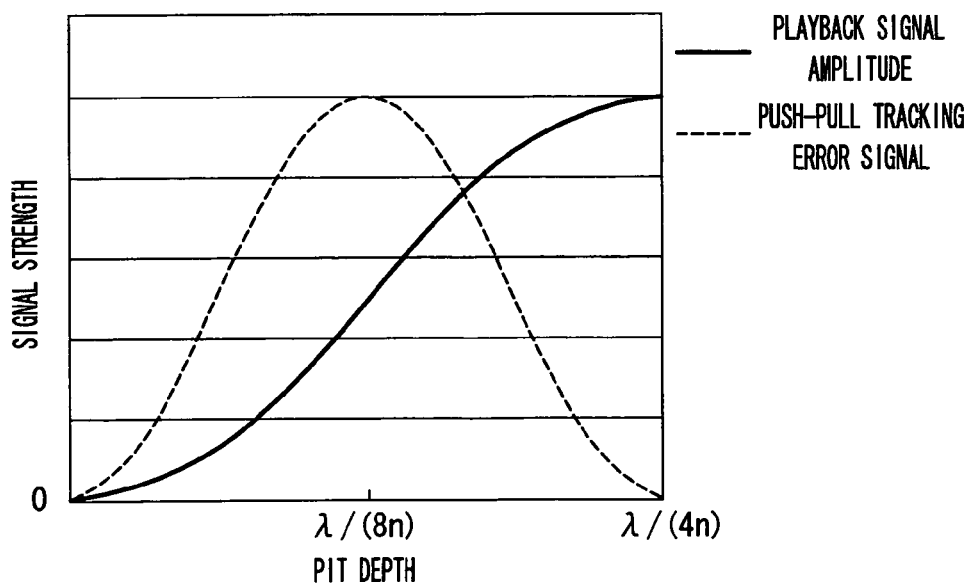
FIG. 8 is a drawing that shows a relationship among the pit depth, the amplitude of a playback signal and the push-pull tracking error signal.

FIG. 8 is a drawing that indicates a general relationship among the pit depth, the playback signal and the push-pull tracking error signal. In FIG. 8, with respect to the playback signal, the strength of the playback signal has a peak at a pit depth of $\lambda/(4n)$, and decreases symmetrically as the depth becomes greater, and again reaches 0 at a pit depth of $2\lambda/(4n)$. In contrast, the push-pull tracking error signal has a peak at a pit depth of $\lambda/(8n)$, and reaches 0 at a pit depth of $\lambda/(4n)$. Further, as the pit depth increases, the strength of the signal again increases although the polarity is inverted. With respect to the pit depth, FIG. 8 shows that in order to carry out the push-pull tracking control, it is necessary to exclude the pit depth $\lambda/(4n)$ at which the push-pull tracking error signal becomes 0. In contrast, the strength of the playback signal becomes greatest at the pit depth $\lambda/(4n)$, the playback signal is preferably set in a range with the pit depth $\lambda/(4n)$ interpolated in between.

Moreover, FIG. 7 implies that in order to satisfy not more than 6.5% in the jitter of the playback signal, the pit depth of not less than $\lambda/(5n)$ is required. Here, it also implies that in order to satisfy not less than 0.08 in the amplitude of the push-pull tracking error signal, the pit depth needs to be set deeper or shallower than $\lambda/(4n)$, with the depth of just $\lambda/(4n)$ being excluded. In association with the pit depth, $\lambda/(4n)$, at which the tracking polarity of the push-pull tracking error signal is changed, when a reproducible margin of the first pit depth $d_1$ on the first substrate 101 and the second pit depth $d_2$ on the second substrate 103 is taken into consideration, the first pit depth $d_1$ on the first signal substrate 101 needs to satisfy the following relational expression:

$$\lambda/(4n)<d_1.$$

In this case, however, in the case when the pit depth becomes deeper, it is predicted that the pit transferring property becomes poorer to fail to form pits having a desired shape; therefore, the pit depth is preferably set at least not more than $\lambda/(3n)$. In other words, it is set so as to satisfy the following relational expression, $$\lambda/(4n)<d_1 \leq \lambda/(3n).$$

Further, presumably, based upon FIG. 7, the first pit depth $d_1$ on the first substrate 101 is set to satisfy the following relational expression in order to obtain the push-pull error signal having a stable size.

$$83 \text{ nm} \leq d_1 \leq 89 \text{ nm}$$

Moreover, the second pit depth $d_2$ of the second substrate 103 needs to satisfy the following relational expression:

$$\lambda/(5n) \leq d_2 < \lambda/(4n).$$

Furthermore, presumably, based upon FIG. 7, the second pit depth $d_2$ on the second substrate 103 is set to satisfy the following relational expression in order to obtain the push-pull error signal having a stable size.

$$53 \text{ nm} \leq d_2 \leq 63 \text{ nm}$$

Here, in the phase-difference tracking system, the controlling operation is carried out without any problems, with the pit depth d being set within the following range:

$$\lambda/(5n) \leq d \leq \lambda/(3n).$$

Furthermore, based upon FIG. 7, the first pit depth $d_1$ is preferably set to satisfy the following relational expression:

$$83 \text{ nm} < d_1 \leq 89 \text{ nm}.$$

Additionally, in the above-mentioned example, the refractive index $n_1$ of the second substrate 103 and the refractive index $n_2$ of the cover layer 105 are dealt as the same refractive index n for convenience of explanation.

When the optical disk according to the present embodiment was reproduced, both of the jitter of the playback signal indicating signal quality and the amplitude of the push-pull tracking error signal were good. Moreover, in accordance with the present embodiment, by making the first pit depth $d_1$ or the second pit depth $d_2$ respectively closer to $\lambda/(4n)$, it becomes possible to increase the S/N ratio of the playback RF amplitude infinitely and also obtain a push-pull tracking error signal. Thus, it becomes possible to carry out tracking control by using both of the tracking systems, that is, the phase-difference tracking system and the push-pull tracking system. Consequently, it becomes possible to provide superior playback signal quality, without limitation in the tracking system of the player.

Moreover, by providing a size relationship between the first concave-shaped pit depth $d_1$ and the second convex-shaped pit depth $d_2$ with a depth $\lambda/(4n)$ interpolated in between, it is possible to make the polarity of the push-pull tracking the same. Therefore, even in a player using the push-pull tracking system, it is not necessary to switch the tracking polarity even when the signal face to be reproduced is switched, thereby making it possible to shorten seeking time and also to simplify the circuit structure of the player.

Here, by controlling pit depths in response to the respective cross-sectional shapes of pits constituting a plurality of signal faces, it is possible to provide the same polarity in the push-pull tracking error signals on the respective signal faces. For example, in the case when the pit cross-sectional shapes forming the two signal faces are respectively different, by setting each of the pit depths $d_1$ and $d_2$ in a manner so as to sandwich $\lambda/(4n_1)$ or $\lambda/(4n_2)$, it is possible to make the polarity of the push-pull tracking error signal the same. In contrast, in the case when the pit cross-sectional shapes are the same, by setting both of the pit depths $d_1$ and $d_2$ on the same side that is greater or smaller than $\lambda/(4n_1)$ or $\lambda/(4n_2)$, it is possible to make the polarity of the push-pull tracking error signal the same.

Moreover, with respect to the first signal face of the first substrate in which the pit depth needs to satisfy $d_1 > \lambda/(4n)$, it is possible to form deeper concave-shaped pits through a resin injection-compression molding process by using a stamper having convex-shaped pits. In contrast, with respect to the second signal face of the second substrate in which the pit depth is sufficiently set to $d_2 < \lambda/(4n)$, it is possible to form convex-shaped signal pits by carrying out a transferring operation on ultraviolet-ray curable resin or photo-curing resin using a transfer stamper having concave-shaped pits. Therefore, a multi-layer optical disk having superior signal characteristics can be manufactured by using processes in which respective layers are laminated in succession from the first substrate.

Here, the present embodiment 1 has discussed a case in which the first pit depth $d_1$ of the first reflective layer is deeper than the second pit depth $d_2$ of the second reflective layer ($d_2 < d_1$); however, this is merely one example. In the optical recording medium relating to the present invention, in contrast, the second pit depth $d_2$ of the second reflective layer may be deeper than the first pit depth $d_1$ of the first reflective layer ($d_1 < d_2$). In this case, in the above-mentioned relational expressions, $d_1$ and $d_2$ are replaced by each other.

Figure 9:
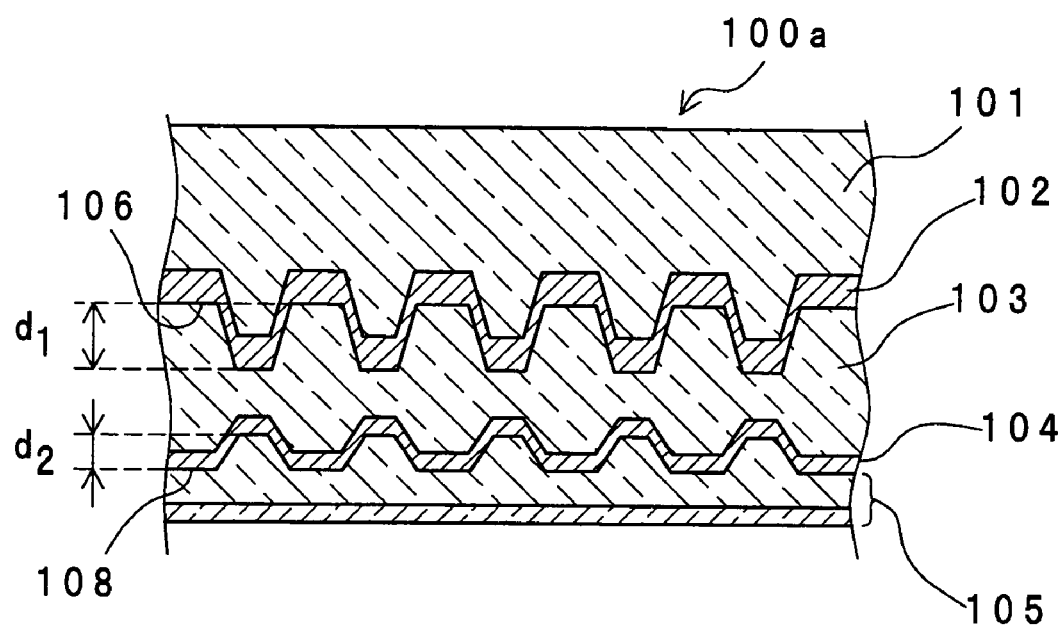
FIG. 9 is a cross-sectional view that shows another example of an optical recording medium in accordance with the first embodiment of the present invention.

Additionally, as shown in the cross-sectional view of FIG. 1, for example, the optical disk 100 has an arrangement in which the lands and the recesses of the first pits on the first substrate 101 and the second pits on the second substrate 103 are placed in a corresponding manner to each other; however, this is merely one example of an optical recording medium of the present invention. The recording medium of the present invention is not intended to be limited by this arrangement. FIG. 9 is a cross-sectional view that shows another example of an optical disk 100a in accordance with embodiment 1. In this optical disk 100a, as shown in the cross-sectional view, the recesses and lands of the first pits on the first substrate 101 and the recesses and lands of the second pits on the second substrate 103 are placed with an offset from each other. In this manner, the recesses and lands of the respective layers may be placed in a manner so as to correspond to each other, or may be placed with an offset from each other.

Embodiment 2

Figure 10:
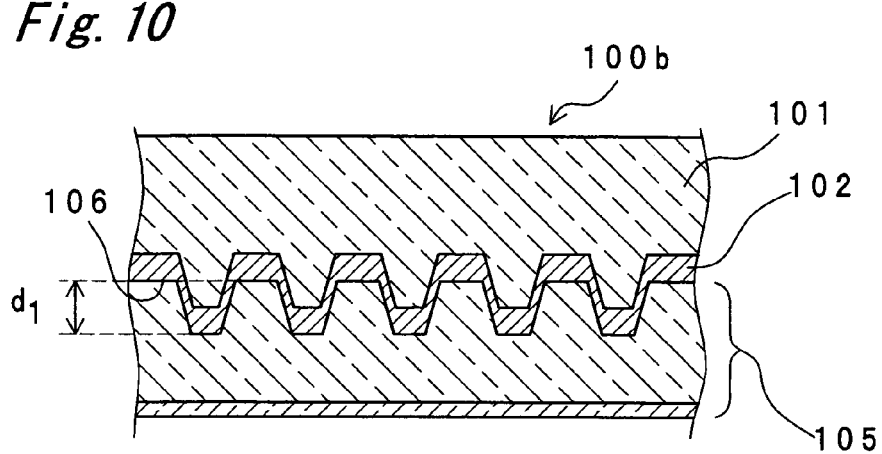
FIG. 10 is a cross-sectional view that shows an optical recording medium in accordance with the second embodiment of the present invention.

FIG. 10 is a cross-sectional view that shows a cross-sectional structure of an optical disk 100b in accordance with embodiment 2. In comparison with the optical disk in accordance with embodiment 1, this optical recording medium 100b is different in that only one signal face for recording signals is prepared. This optical disk 100b is provided with a substrate 101 that has convex-shaped pits on one of the faces, a reflective layer 102 that is formed on the convex-shaped pits of the first substrate 101 in a manner so as to reflect the recesses and lands, and a cover layer 105 that is formed on the reflective layer 102. A signal face 106 made of convex-shaped pits is formed on the reflective layer 102.

In the optical disk 100b, with respect to a pit depth d that corresponds to a difference between the recesses and lands of the reflective layer 102, the wavelength $\lambda$ of signal-reproducing laser light and the refractive index n of the cover layer 105, the following relational expressions are satisfied:

$$\lambda/(5n) \leq d \leq \lambda/(3n), \text{ and } d \neq \lambda/(4n).$$

In the optical disk 100b, the pit depth d is set in a range, $\lambda/(5n) \leq d \leq \lambda/(3n)$, that provides a sufficient playback signal, and a depth $\lambda/(4n)$ that fails to provide an amplitude having a sufficient strength of a push-pull tracking error signal is excluded. Thus, it becomes possible to provide a sufficient playback signal and also to carry out tracking control in the push-pull tracking system.

Embodiment 3

Figure 11:
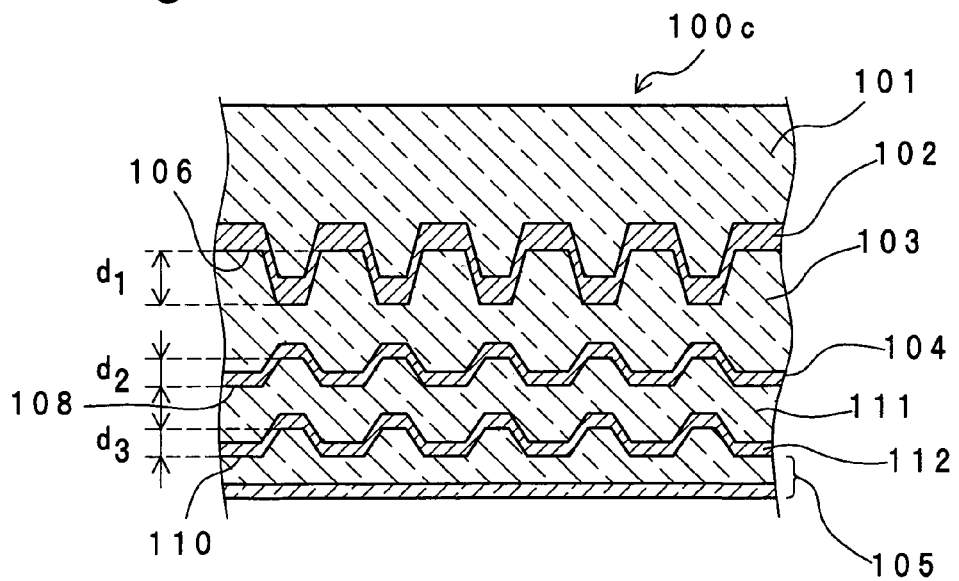
FIG. 11 is a cross-sectional view that shows an optical recording medium in accordance with the third embodiment of the present invention.

FIG. 11 is a cross-sectional view that shows a cross-sectional structure of an optical disk 100c in accordance with third embodiment. In comparison with the optical disk in accordance with embodiment 1, this optical disk 100c is different in that three layers of signal faces for recording signals are prepared. This optical disk 100c is provided with a first substrate 101, a first reflective layer 102, a second substrate 103, a second reflective layer 104, a third substrate 111, a third reflective layer 112 and a cover layer 105 that are successively laminated in this order. The first substrate 101 has convex-shaped first pits on one of the faces. The first reflective layer 102 is formed on the concave-shaped first pits of the first substrate 101 in a manner so as to reflect the recesses and lands. This first reflective layer 102 has a first signal face 106 made of concave-shaped pits. The second substrate 103, which is formed on the first reflective layer 102, has second convex-shaped pits on a face on the opposite side to the first reflective layer 102. The second reflective layer 104 is formed on the convex-shaped second pits of the second substrate 103 in a manner so as to reflect the recesses and lands. The second reflective layer 104 has a second signal face 108 made of convex shaped pits. The third substrate 111, which is formed on the second reflective layer 104, has convex-shaped third pits on a face on the opposite side to the second reflective layer 104. The third reflective layer 112 is formed on the convex-shaped third pits of the third substrate 111 in a manner so as to reflect the recesses and lands. The third reflective layer 112 has a third signal face 110 made of convex shaped pits. The cover layer 105 is formed on the third reflective layer. Specifically, in addition to the optical disk in accordance with embodiment 1, this optical disk 100c is further provided with the third substrate 111 having the third pits and the third reflective layer 112 between the second reflective layer 104 and the cover layer 105.

In the optical disk 100c, in the same manner as the optical disk in accordance with embodiment 1, the depth $d_1$ of the first concave-shaped pits of the first reflective layer 102 satisfies the following relational expression:

$$\lambda/(4n_1) < d_1 \leq \lambda/(3n_1).$$

Moreover, the depth $d_2$ of the second convex-shaped pits of the second reflective layer 104 satisfies the following relational expression:

$$\lambda/(5n_2) \leq d_2 < \lambda/(4n_2).$$

With this arrangement, the first signal face made of the concave-shaped first pits and the second signal face made of the convex-shaped second pits are allowed to have the same polarity in the push-pull tracking error signal. Therefore, even when the tracking control is continuously carried out on the respective signal faces, it is not necessary to invert the polarity.

Moreover, in this optical disk 100c, with respect to a pit depth $d_3$ that corresponds to a difference between the recesses and lands of the third reflective layer 112, the wavelength λ of signal-reproducing laser light and the refractive index $n_3$ of the cover layer 105, the following relational expressions are satisfied:

$$\lambda/(5n_3) \leq d_3 \leq \lambda/(3n_3), \text{ and } d_3 \neq \lambda/(4n_3).$$

Therefore, the third pit depth $d_3$ is set in a range, $\lambda/(5n_3) \leq d_3 \leq \lambda/(3n_3)$, that provides a sufficient playback signal, and a depth $\lambda/(4n_3)$ that fails to provide an amplitude having a sufficient strength of a push-pull tracking error signal is excluded. Thus, with respect to the third signal face made of the third pits of the third reflective layer 112, it becomes possible to provide a sufficient playback signal and also to carry out tracking control in the push-pull tracking system.

Moreover, in the case when the first pits are formed into a concave shape, the second pits are formed into a convex shape and the third pits are formed into a convex shape, when viewed from the laser light incident side of the optical disk 100c, in addition to the above-mentioned conditions, $$\lambda/(4n_1) < d_1 \leq \lambda/(3n_1), \text{ and}$$

$$\lambda/(5n_2) \leq d_2 < \lambda/(4n_2),$$

the following condition is satisfied:

$$\lambda/(5n_3) \leq d_3 < \lambda/(4n_3).$$

With this arrangement, even when any one of the first signal face made of the concave-shaped first pits, the second signal face made of the convex-shaped second pits and the third signal face made of the convex-shaped third pits is subjected to a push-pull tracking control process, each of the push-pull tracking error signals is made to have the same polarity.

Even in the case when signal faces of four layers or more are formed, by controlling the pit depths in response to the pit cross-sectional shapes that constitute the signal faces, each of the push-pull tracking error signals is made to have the same polarity.

Embodiment 4

Figure 12:
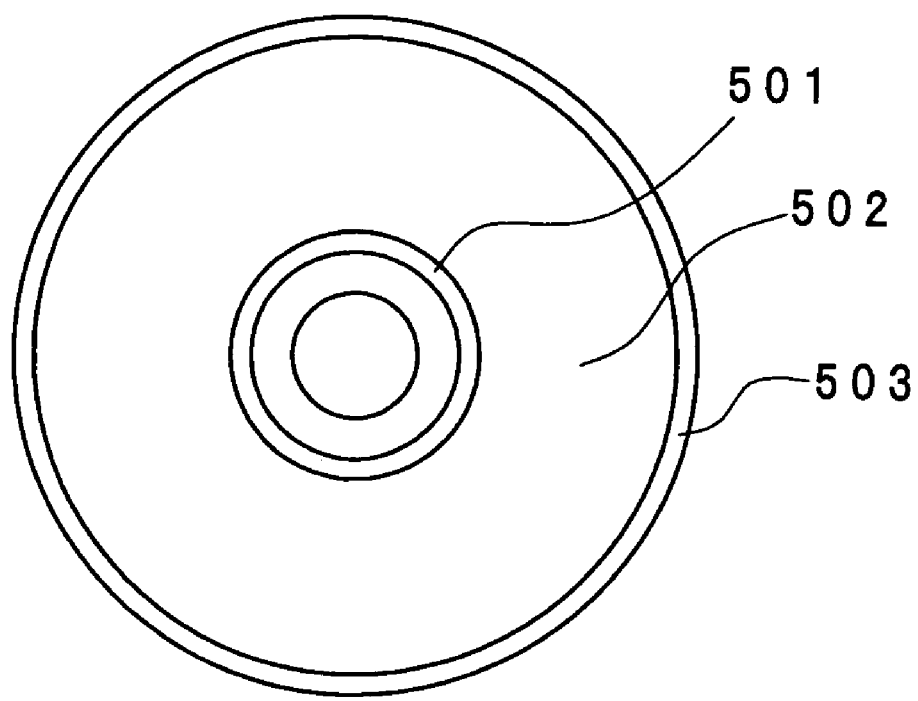
FIG. 12 is an information layout drawing that shows an optical disk in accordance with the fourth embodiment of the present invention.

Referring to FIG. 12, the following description will discuss an optical disk in accordance with embodiment 4 of the present invention. FIG. 12 is an information layout drawing of this optical disk. For example, this optical disk is constituted by a disk information section 501 that contains data that controls the length of disk main recording data and the disk, a main data section 502 in which the main data are recorded and a read-out unit 503 that indicates a disk circumferential end that is recorded upon completion of the main data section of the disk. The disk information section 501 is an information section that is reproduced prior to reading the main data section when the disk is reproduced. Winding pit rows are formed on the disk information section 501, and prior to carrying out tracking control on the pit rows, by reading the frequency of the winding of the pits, the push-pull tracking polarity of each of the signal layers of the disk can be read.

With respect to the method for forming these winding pits, the following processes are carried out.

(a) For example, a process is carried out in which an electron beam is irradiated to a base member such as an Si wafer to which photoresist has been applied, while the base member is being rotated. This process is achieved by deflecting the pointing of the electron beam that is focused on the base member in a direction perpendicular to the rotation direction of the base member, by using a deflection device.

(b) The photoresist portion irradiated with the electron beam is subjected to a developing process, and then removed so that the surface of the Si wafer is exposed.

(c) After Ni sputtering process of a conductive film has been carried out on the Si wafer, the resulting wafer is subjected to Ni plating so that a metal mold (stamper) in which winding signal pits, each having a convex shape, are formed is manufactured.

(d) Next, the stamper is installed as the metal mold of an injection-compression molding device, and an injection molding process is carried out by using resin material such as polycarbonate so that a substrate on which the winding signal pits, each having a concave shape, are formed is manufactured.

Here, the manufacturing method for an optical disk has been described in embodiment 1; therefore, the description thereof is omitted.

Further, the present invention may have the following structures indicated by various embodiments.

In accordance with a first structure, the optical recording medium relating to the present invention is provided with: a first substrate having concave-shaped first pits on one face thereof; and a first reflective layer that is formed on the face bearing the first pits of the first substrate in a manner so as to reflect recesses and lands of the first pits;

a second substrate that is formed on the first reflective layer, with convex-shaped second pits being formed on a face on the side opposite to the first reflective layer;

a second reflective layer that is formed on the face bearing the second pits of the second substrate in a manner so as to reflect lands and recesses of the second pits; and a cover layer formed on the second reflective layer. This structure is characterized in that in association with the refractive index $n_1$ of the second substrate, the refractive index $n_2$ of the cover layer and the wavelength λ of signal-reproducing laser light, the first pit depth $d_1$, which is a difference between recesses and lands of the first reflective layer, and the second pit depth $d_2$, which is a difference between lands and recesses of the second reflective layer, are designed to satisfy either of the following relational expressions: $4n_1 d_1 < \lambda < 4n_2 d_2$ or $4n_2 d_2 < \lambda \leq 4n_1 d_1$.

In accordance with the above-mentioned structure, the first pit depth $d_1$, which is a difference between recesses and lands of the first reflective layer, and the second pit depth $d_2$, which is a difference between lands and recesses of the second reflective layer, are designed so as to have a size relationship, with a depth $\lambda/(4n)$ at which the polarity of the push-pull tracking error signal is inverted being interpolated in between, when they are respectively tracking-controlled in the push-pull tracking system. Thus, when the respective signal faces of the first reflective layer and the second reflective layer are tracking-controlled by the push-pull tracking system, it becomes possible to provide the same polarity of the tracking error signal. Consequently, even when the signal face to be reproduced is switched, it is not necessary to switch the polarity of the tracking error signal. Moreover, it is possible to obtain a tracking error signal, and also to carry out tracking control by using either of the two systems, that is, the phase difference tracking control system and the push-pull tracking control system.

In accordance with a second structure, the first pit depth $d_1$ and the second pit depth $d_2$ satisfy a relational expression, $d_1 > d_2$. Therefore, the first substrate may be formed by using injection molding method that has good transferring property and makes deeper pit depths, and in contrast, the second substrate may be formed by using transferring process through a transfer substrate that tends to make shallow pit depths.

In accordance with a third structure, the first pit depth $d_1$ satisfies the following relational expression:

$$\lambda/(4n_1) < d_1 \leq \lambda/(3n_1), \text{ and}$$

the second pit depth $d_2$ satisfies the following relational expression:

$$\lambda/(5n_2) \leq d_2 \lambda/(4n_2).$$

In accordance with the above-mentioned structure, since each of the pit depths $d_1$ and $d_2$ is located in a range from $\lambda/(5n)$ to $\lambda/(3n)$, it becomes possible to obtain a playback signal having a sufficient size from each of the signal faces.

While the invention has been described in detail and with reference to preferred embodiments thereof, the present invention is not limited to these embodiments, and it will be apparent to one skilled in the art that various changes and modifications can be made therein without departing from the spirit and scope of the following claims.

The invention claimed is:

1. An optical recording medium comprising:
   a first substrate having first pits on one face thereof;
   a first reflective layer formed on the face bearing the first pits of the first substrate in a manner so as to reflect lands and recesses of the first pits;
   a second substrate formed on the first reflective layer, with second pits being formed on a face on the side opposite to the first reflective layer;
   a second reflective layer formed on the face bearing the second pits of the second substrate in a manner so as to reflect lands and recesses of the second pits; and
   a cover layer formed on the second reflective layer,
   wherein a first pit depth $d_1$, which is a difference between lands and recesses of the first reflective layer, a wavelength $\lambda$ of signal-reproducing laser light and a refractive index $n_1$ of the second substrate satisfy the following relational expressions, $$\lambda/(5n_1) \leq d_1 \leq \lambda/(3n_1) \text{ and } d_1 \neq \lambda/(4n_1),$$

wherein a second pit depth $d_2$, which is a difference between lands and recesses of the second reflective layer, the wavelength $\lambda$ of signal-reproducing laser light and a refractive index $n_2$ of the cover layer satisfy the following relational expressions, $$\lambda/(5n_2) \leq d_2 \leq \lambda/(3n_2) \text{ and } d_2 \neq \lambda/(4n_2),$$

wherein the first pits of the first substrate and the second pits of the second substrate are formed by a combination of concave-shaped pits and convex-shaped pits or a combination of convex-shaped pits and concave-shaped pits,
   wherein the first pit depth $d_1$ is a difference between lands and recesses of the first reflective layer, and the second pit depth $d_2$ is a difference between lands and recesses of the second reflective layer, and
   wherein the first pit depth $d_1$ and the second pit depth $d_2$ satisfy the following relational expressions, with respect to the refractive index $n_1$ of the second substrate, the refractive index $n_2$ of the cover layer and the wavelength $\lambda$ of signal-reproducing laser light, $$4n_1 d_1 < \lambda < 4n_2 d_2.$$

2. The optical recording medium according to claim 1, wherein the second substrate is formed by using ultraviolet-ray curable resin or photo-curing resin.

3. The optical recording medium according to claim 1, wherein at least either the first pits of the first reflective layer or the second pits of the second reflective layer include information for tracking polarity.

4. The optical recording medium according to claim 3, wherein the information for tracking polarity is recorded as winding pit rows.

5. The optical recording medium according to claim 4, wherein the winding of the winding pit rows is formed by frequency modulation.

6. The optical recording medium according to claim 1, further comprising:
   a third substrate formed on the second reflective layer in place of the cover layer, and has third pits formed on a face on the side opposite to the second reflective layer, with a refractive index of $n_2$;
   a third reflective layer formed on the face bearing the third pits of the third substrate in a manner so as to reflect lands and recesses of the third pits; and
   a cover layer formed on the third reflective layer,
   wherein a third pit depth $d_3$, which is a difference between lands and recesses of the third reflective layer, the wavelength $\lambda$ of signal-reproducing laser light and the refractive index $n_3$ of the cover layer satisfy the following relational expressions, $$\lambda/(5n_3) \leq d_3 \leq \lambda/(3n_3) \text{ and } d_3 \neq \lambda/(4n_3).$$

7. An optical recording medium comprising:
   a first substrate having first pits on one face thereof;
   a first reflective layer formed on the face bearing the first pits of the first substrate in a manner so as to reflect lands and recesses of the first pits;
   a second substrate formed on the first reflective layer, with second pits being formed on a face on the side opposite to the first reflective layer;
   a second reflective layer formed on the face bearing the second pits of the second substrate in a manner so as to reflect lands and recesses of the second pits; and
   a cover layer formed on the second reflective layer,
   wherein a first pit depth $d_1$, which is a difference between lands and recesses of the first reflective layer, a wavelength $\lambda$ of signal-reproducing laser light and a refractive index $n_1$ of the second substrate satisfy the following relational expressions, $$\lambda/(5n_1) \leq d_1 \leq \lambda/(3n_1) \text{ and } d_1 \neq \lambda/(4n_1),$$

wherein a second pit depth $d_2$, which is a difference between lands and recesses of the second reflective layer, the wavelength $\lambda$ of signal-reproducing laser light and a refractive index $n_2$ of the cover layer satisfy the following relational expressions, $$\lambda/(5n_2) \leq d_2 \leq \lambda/(3n_2) \text{ and } d_2 \neq \lambda/(4n_2),$$

wherein the first pits of the first substrate and the second pits of the second substrate are formed by a combination of concave-shaped pits and convex-shaped pits or a combination of convex-shaped pits and concave-shaped pits,
   wherein the first pit depth $d_1$ is a difference between lands and recesses of the first reflective layer, and the second pit depth $d_2$ is a difference between lands and recesses of the second reflective layer, and wherein the first pit depth $d_1$ and the second pit depth $d_2$ satisfy the following relational expressions, with respect to the refractive index $n_1$ of the second substrate, the refractive index $n_2$ of the cover layer and the wavelength $\lambda$ of signal-reproducing laser light:

$$4n_2d_2<\lambda<4n_1d_1.$$

8. The optical recording medium according to claim 7, wherein the second substrate is formed by using ultraviolet-ray curable resin or photo-curing resin.

9. The optical recording medium according to claim 7, wherein at least either the first pits of the first reflective layer or the second pits of the second reflective layer include information for tracking polarity.

10. The optical recording medium according to claim 9, wherein the information for tracking polarity is recorded as winding pit rows.

11. The optical recording medium according to claim 10, wherein the winding of the winding pit rows is formed by frequency modulation.

12. An optical recording medium comprising:
a first substrate having first pits on one face thereof;
a first reflective layer formed on the face bearing the first pits of the first substrate in a manner so as to reflect lands and recesses of the first pits;
a second substrate formed on the first reflective layer, with second pits being formed on a face on the side opposite to the first reflective layer;
a second reflective layer formed on the face bearing the second pits of the second substrate in a manner so as to reflect lands and recesses of the second pits; and
a cover layer formed on the second reflective layer,
wherein a first pit depth $d_1$, which is a difference between lands and recesses of the first reflective layer, a wavelength $\lambda$ of signal-reproducing laser light and a refractive index $n_1$ of the second substrate satisfy the following relational expressions, $$\lambda/(5n_1) \leq d_1 \leq \lambda/(3n_1) \text{ and } d_1 \neq \lambda/(4n_1),$$

wherein a second pit depth $d_2$, which is a difference between lands and recesses of the second reflective layer, the wavelength $\lambda$ of signal-reproducing laser light and a refractive index $n_2$ of the cover layer satisfy the following relational expressions, $$\lambda/(5n_2) \leq d_2 \leq \lambda/(3n_2) \text{ and } d_2 \neq \lambda/(4n_2),$$

wherein both of the first pits of the first substrate and the second pits of the second substrate are formed by a combination of concave-shaped pits or a combination of convex-shaped pits, wherein the first pit depth $d_1$ is a difference between lands and recesses of the first reflective layer, and the second pit depth $d_2$ is a difference between lands and recesses of the second reflective layer, and wherein the first pit depth $d_1$ and the second pit depth $d_2$ satisfy the following relational expressions, with respect to the refractive index $n_1$ of the second substrate, the refractive index $n_2$ of the cover layer and the wavelength $\lambda$ of signal-reproducing laser light, $$\lambda<4n_1d_1 \text{ and } \lambda<4n_2d_2.$$

13. The optical recording medium according to claim 12, wherein the second substrate is formed by using ultraviolet-ray curable resin or photo-curing resin.

14. The optical recording medium according to claim 12, wherein at least either the first pits of the first reflective layer or the second pits of the second reflective layer include information for tracking polarity.

15. The optical recording medium according to claim 14, wherein the information for tracking polarity is recorded as winding pit rows.

16. The optical recording medium according to claim 15, wherein the winding of the winding pit rows is formed by frequency modulation.

17. An optical recording medium comprising:
a first substrate having first pits on one face thereof;
a first reflective layer formed on the face bearing the first pits of the first substrate in a manner so as to reflect lands and recesses of the first pits;
a second substrate formed on the first reflective layer, with second pits being formed on a face on the side opposite to the first reflective layer;
a second reflective layer formed on the face bearing the second pits of the second substrate in a manner so as to reflect lands and recesses of the second pits; and
a cover layer formed on the second reflective layer,
wherein a first pit depth $d_1$, which is a difference between lands and recesses of the first reflective layer, a wavelength $\lambda$ of signal-reproducing laser light and a refractive index $n_1$ of the second substrate satisfy the following relational expressions, $$\lambda/(5n_1) \leq d_1 \leq \lambda/(3n_1) \text{ and } d_1 \neq \lambda/(4n_1),$$

wherein a second pit depth $d_2$, which is a difference between lands and recesses of the second reflective layer, the wavelength $\lambda$ of signal-reproducing laser light and a refractive index $n_2$ of the cover layer satisfy the following relational expressions, $$\lambda/(5n_2) \leq d_2 \leq \lambda/(3n)) \text{ and } d_2 \neq \lambda/(4n_2),$$

wherein both of the first pits of the first substrate and the second pits of the second substrate are formed by a combination of concave-shaped pits or a combination of convex-shaped pits, wherein the first pit depth $d_1$ is a difference between lands and recesses of the first reflective layer, and the second pit depth $d_2$ is a difference between lands and recesses of the second reflective layer, and wherein the first pit depth $d_1$ and the second pit depth $d_2$ satisfy the following relational expressions, with respect to the refractive index $n_1$ of the second substrate, the refractive index $n_2$ of the cover layer and the wavelength $\lambda$ of signal-reproducing laser light, $$4n_1d_1<\lambda \text{ and } 4n_2d_2<\lambda.$$

18. The optical recording medium according to claim 17, wherein the second substrate is formed by using ultraviolet-ray curable resin or photo-curing resin.

19. The optical recording medium according to claim 17, wherein at least either the first pits of the first reflective layer or the second pits of the second reflective layer include information for tracking polarity.

20. The optical recording medium according to claim 19, wherein the information for tracking polarity is recorded as winding pit rows.

* * * * *

UNITED STATES PATENT AND TRADEMARK OFFICE
CERTIFICATE OF CORRECTION

| | | |
|---|---|---|
| PATENT NO. | : 7,539,121 B2 | Page 1 of 1 |
| APPLICATION NO. | : 10/550069 | |
| DATED | : May 26, 2009 | |
| INVENTOR(S) | : Morio Tomiyama et al. | |

It is certified that error appears in the above-identified patent and that said Letters Patent is hereby corrected as shown below:

In column 19, claim 1, line 55, "$\lambda/(5n_2) \leq d_2 \leq \lambda/(3n_2)$ and $d_2 \neq \lambda(4n_2)$" should read --$\lambda/(5n_2) \leq d_2 \leq \lambda/(3n_2)$ and $d_2 \neq \lambda/(4n_2)$--.

In column 20, claim 7, line 54, "$\lambda/(5n_1) \leq d_1 \leq \lambda(3n_1)$ and $d_1 \neq \lambda/(4n_1)$" should read --$\lambda/(5n_1) \leq d_1 \leq \lambda/(3n_1)$ and $d_1 \neq \lambda/(4n_1)$--.

In column 21, claim 7, line 3, "d," should read --$d_1$--.

In column 21, claim 12, line 40, "$\lambda/(5n_1) \leq d_1 \leq \lambda/(3n_1)$ and $d_1 \neq /(4n_1)$" should read --$\lambda/(5n_1) \leq d_1 \leq \lambda/(3n_1)$ and $d_1 \neq \lambda/(4n_1)$--.

In column 22, claim 17, line 37, "$\lambda/(5n_2) \leq d_2 \leq \lambda/(3n))$ and $d_2 \neq \lambda/(4n_2)$" should read --$\lambda/(5n_2) \leq d_2 \leq \lambda/(3n_2)$ and $d_2 \neq \lambda/(4n_2)$--.

In column 22, claim 17, line 42, "d," should read --$d_1$--.

In column 22, claim 17, line 47, "d," should read --$d_1$--.

Signed and Sealed this

Twenty-second Day of December, 2009

David J. Kappos
*Director of the United States Patent and Trademark Office*